United States Patent [19]

Watanabe et al.

[11] 4,431,745

[45] Feb. 14, 1984

[54] CARBON-BONDED MAGNESIA CARBON BRICKS

[75] Inventors: Akira Watanabe, Okayama; Takeo Okamura, Bizen; Goji Saeki, Okayama, all of Japan

[73] Assignee: Kyushu Refractories Co., Ltd., Okayama, Japan

[21] Appl. No.: 379,014

[22] Filed: May 17, 1982

[51] Int. Cl.$^3$ .................. C04B 35/04; C04B 35/52
[52] U.S. Cl. ................................ 501/101; 501/109
[58] Field of Search .............................. 501/101, 109

[56] References Cited

U.S. PATENT DOCUMENTS

| | | | |
|---|---|---|---|
| 3,236,664 | 2/1966 | Wilson | 501/101 |
| 4,130,438 | 12/1978 | Watanabe et al. | 501/101 |
| 4,210,453 | 7/1980 | Bowers | 501/101 |
| 4,238,121 | 12/1980 | Harita et al. | 501/101 |
| 4,306,030 | 12/1981 | Watanabe et al. | 501/101 |

FOREIGN PATENT DOCUMENTS 56-84371  7/1981  Japan ................................ 501/101

Primary Examiner—James Poer
Attorney, Agent, or Firm—Wenderoth, Lind & Ponack

[57] ABSTRACT

The invention relates to carbon-bonded magnesia carbon bricks for use in converters, ladles, ladle refinery, mixing cars, mixing furnaces, etc., and the method for obtaining such carbon-bonded magnesia carbon bricks having high properties in respect of resistance to thermal and structural spalling, slag resistance, thermal strength, shock resistance, etc. thereby enabling to conform to the gradually intensified operational conditions of said converters and the like by means of 60-97 weight % sintered magnesia clinker of bulk specific gravity above 3.40, 3-40 weight % carbonaceous material and a carbon-bonding formative agent.

2 Claims, No Drawings

CARBON-BONDED MAGNESIA CARBON BRICKS

The invention relates to carbon-bonded magnesia carbon bricks, and more particularly to carbon-bonded magnesia carbon bricks characterized in that said bricks comprise sintered magnesia clinker of bulk specific gravity above 3.40, carbonaceous material and a carbon-bonding formative agent.

In recent years, the lining life of the furnace body of converters has been greatly lengthened as a result of apposite arrangement of refractory bricks, improvement in hot gunning technique, introduction of slag control, etc. At the same time, however, the operational conditions of the converter are becoming more severe due to increased ratio of continuous casting, demand for steels of higher grades, etc. Thus the use of refractories of higher properties has come to be demanded in order to further lengthen the lining life of the furnace body.

Magnesia dolomite bricks burned at a high temperature have been conventionally used as furnace material for the converter. However, as the operational conditions became more severe, said bricks have come to be replaced by magnesia carbon bricks. The magnesia carbon bricks possess longer lining life with their high properties, such as resistance to thermal and structural spalling, slag resistance, thermal strength, etc. compared with magnesia dolomite bricks.

However, in case of the use of sintered magnesia clinker of bulk specific gravity below 3.40 generally used as magnesia refractory material of magnesia carbon bricks, said sintered magnesia clinker has insufficient affinity for carbon bond. Thus, the thermal strength during the operation is greatly deteriorated thereby making it impossible to obtain long lining life when used in locations susceptible to heavy shocks of scraps and the like.

The deterioration of thermal strength can be prevented by the use of electrofused magnesia clinker as magnesia refractory material. The effect, however, is not so high as is expected and long lining life is not obtainable since the very structure of electrofused magnesia clinker has low resistance to shocks. The electrofused magnesia clinker has another disadvantage in that the high price thereof greatly elevates the prime cost of the furnace material.

The inventors, after a series of careful researches on the solution of the above-described difficulties, have found that by the use of sintered magnesia clinker of bulk specific gravity above 3.40 it is possible to obtain carbon-bonded magnesia carbon bricks in which the shock resistance is further improved with less deterioration of the strength due to improved affinity between the carbon bond and the sintered magnesia clinker. The present invention is based upon this finding.

In detail, the invention relates to carbon-bonded magnesia carbon bricks comprising 60–97 weight % sintered magnesia clinker of bulk specific gravity above 3.40, preferably above 3.42, 3–40 weight % carbonaceous material and a carbon-bonding formative agent.

Sintered magnesia clinker of bulk specific gravity above 3.40 is obtainable by burning it at a higher temperature. Thus not only the structure of the clinker is further compacted but also the crystal growth of its surface is greatly accelerated thereby producing a favorable effect on the improvement of affinity for the carbon bond. Such a favorable effect is not obtainable in case the bulk specific gravity is below 3.40.

The sintered magnesia clinker used in the invention contains MgO in excess of 96 weight %, preferably in excess of 98 weight %. If MgO is less than 96 weight %, the content of impurities is necessarily increased thereby greatly deteriorating the resistance to corrosion.

The amount of such sintered magnesia clinker is 60–97 weight %, preferably 70–92 weight %. In case the amount is less than 60 weight %, the thermal properties are deteriorated, while if in excess of 97 weight %, the corrosion resistance is undesirably reduced due to slag infiltration.

The carbonaceous material comprises plumbago, synthetic graphite, electrode waste, petroleum coke, foundry coke, carbon black, etc., among which plumbago is preferable in view of its oxidization resistance, high packing density at the time of pressing, etc. The amount of such carbonaceous materials is 3–40 weight %, preferably 5–30 weight %. If the amount is less than 3 weight %, the characteristic features of carbon, such as slag resistance and spalling resistance, are not obtainable, while if in excess of 40 weight %, the strength and oxidization resistance of the bricks are unpreferably reduced.

The carbon-bonding formative agent comprises materials capable of forming carbon bond when heated, for example, thermosetting resins, thermoplastic resins, resinous pitch, tar, etc. The suitable adding amount of such carbon-bonding formative agent is 0.5–7.0 weight % of the aggregate of the sintered magnesia clinker and the carbonaceous material. If the adding amount is less than 0.5 weight %, satisfactory bonding effect is not obtainable, while if in excess of 7.0 weight %, cracks and softened deformation are liable to occur during the heat treatment of the brick production.

The magnesia carbon bricks are produced by adding a carbon-bonding formative agent to particle size controlled sintered magnesia clinker and carbonaceous material, the kneaded mixture being pressed by the usual method and then subjected to heat treatment.

By adding 0.5–10 weight % metal power of Al, Si, Mg, Ti, Cr. etc. to the magnesia carbon bricks thus obtained, the oxidization resistance and wear resistance thereof may be further improved. In case the adding amount is less than 0.5 weight %, the effect of addition is not produced, while if in excess of 10 weight %, the corrosion resistance is undesirably reduced.

The carbon-bonded magnesia carbon bricks according to the invention which use the sintered magnesia clinker having a compact structure and improved surface properties have a greater affinity between carbon bond and magnesia clinker, whereby not only the thermal strength and shock resistance are highly improved but also the strength is less deteriorated even when used for a long period of time or subjected to thermal cycles of heating and cooling. Thus the magnesia carbon bricks according to the invention have highly improved shock resistance and wear resistance which properties were deficient in the conventional magnesia carbon bricks, thereby achieving longer lining life even when used in locations subjected to severe conditions.

Thus, the carbon-bonded magnesia carbon bricks according to the invention ensure long lining life when used in a ladle, ladle refinery, AOD, RH, DH, mixing car, mixing furnace, etc., to say nothing of a converter.

The invention will now be described in more detail in reference to the examples described hereinunder.

EXAMPLE 1-6

The materials shown in Table 1 were mixed. The mixture was subjected to friction press and then to heat treatment at 300° C. for 2 hours to obtain samples. The test results of the physical properties and modulus of rupture of the samples thus obtained are shown in Table 1.

By using sintered magnesia clinker of bulk specific gravity below 3.40, reference samples 1-3 were produced in the same manner. The physical properties thereof are also shown in Table 1.

TABLE 1

|  |  |  | Example 1 | 2 | 3 | 4 | 5 | 6 | Comparative Example 1 | 2 | 3 |
|---|---|---|---|---|---|---|---|---|---|---|---|
| Sintered Magnesia Clinker | (A) | 5~3mm | 30 | 30 | 30 | 30 | 30 | 30 |  |  |  |
| Sintered Magnesia Clinker |  | 3~1mm | 25 | 25 | 25 | 25 | 25 | 25 |  |  |  |
| Sintered Magnesia Clinker |  | <1mm | 40 | 35 | 25 | 40 | 35 | 25 |  |  |  |
| Sintered Magnesia Clinker | (B) | 5~3mm |  |  |  |  |  |  | 30 | 30 | 30 |
| Sintered Magnesia Clinker |  | 3~1mm |  |  |  |  |  |  | 25 | 25 | 25 |
| Sintered Magnesia Clinker |  | <1mm |  |  |  |  |  |  | 40 | 35 | 25 |
| Plumbago |  |  | 5 | 10 | 20 | 5 | 10 | 20 | 5 | 10 | 20 |
| Metallic Aluminum | (out) |  | — | — | — | 3 | 3 | 3 | — | — | — |
| Metallic Silicon | (out) |  | — | — | — | 3 | 3 | 3 | — | — | — |
| Phenolic Resin | (out) |  | 3 | 3 | 3 | 3 | 3 | 3 | 3 | 3 | 3 |
| MgO |  |  | 93.5 | 88.6 | 78.7 | 86.6 | 82.0 | 72.9 | 93.1 | 88.2 | 78.4 |
| Fixed Carbon |  |  | 5.5 | 10.0 | 19.0 | 5.2 | 9.3 | 17.7 | 5.5 | 10.0 | 19.0 |
| Apparent Porosity (%) |  |  | 2.6 | 2.3 | 3.2 | 2.4 | 2.3 | 3.1 | 4.5 | 4.0 | 5.8 |
| Bulk Specific Gravity |  |  | 3.04 | 2.99 | 2.89 | 3.03 | 2.98 | 2.89 | 2.95 | 2.82 | 2.75 |
| Crushing Strength (kg/cm$^2$) |  |  | 780 | 529 | 348 | 818 | 541 | 364 | 530 | 440 | 290 |
| Modulus of Rupture (kg/cm$^2$) |  |  |  |  |  |  |  |  |  |  |  |
| Room temperature |  |  | 273 | 201 | 118 | 285 | 212 | 127 | 140 | 105 | 75 |
| 1400° C. |  |  | 189 | 177 | 98 | 264 | 203 | 114 | 110 | 85 | 70 |
| Modulus of Rupture after Heat Treatment at 1600° C., 2 hrs (1400° C., kg/cm$^2$) |  |  | 170 | 159 | 88 | 224 | 173 | 98 | 85 | 66 | 54 |

The physical properties of sintered magnesia clinker, (A) and (B), used in the samples and reference samples of Table 1 are as shown in Table 2.

TABLE 2

| Physical Properties | Burned Magnesia Clinker (A) | (B) |
|---|---|---|
| Apparent Porosity (%) | 2.1 | 1.9 |
| Water Absorption (%) | 0.6 | 0.6 |
| Apparent Specific Gravity | 3.55 | 3.45 |
| Bulk Specific Gravity | 3.47 | 3.38 |

Table 1 shows that the samples have greater modulus of rupture over the reference samples. This shows that the samples have greatly improved shock resistance and wear resistance. When the modulus of rupture after heat treatment at 1600° C. is compared with that after heat treatment at 300° C., the samples according to the invention show smaller reduction in strength. This shows that the structure is less deteriorated. Thus, the superiority of the carbon-bonded magnesia carbon bricks according to the invention is substantiated.

What is claimed is:

1. Carbon-bonded magnesia carbon bricks characterized in that said bricks comprise 60-97 weight % sintered magnesia clinker of bulk specific gravity above 3.40, 3-40 weight % carbonaceous material and a carbon bonding formative agent.

2. Carbon-bonded magnesia carbon bricks according to claim 1 wherein the sintered magnesia clinker contains MgO in excess of 96 weight %.

* * * * *